US011016920B2

(12) United States Patent
Bandi et al.

(10) Patent No.: US 11,016,920 B2
(45) Date of Patent: May 25, 2021

(54) ADAPTIVE CALIBRATION TECHNIQUE FOR CROSS TALK CANCELLATION

(71) Applicant: Intel Corporation, Santa Clara, CA (US)

(72) Inventors: Chenchu Punnarao Bandi, Bayan Lepas (MY); Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 15/396,179

(22) Filed: Dec. 30, 2016

(65) Prior Publication Data
US 2018/0189213 A1   Jul. 5, 2018

(51) Int. Cl.
G06F 13/40   (2006.01)
G06F 13/42   (2006.01)
G06F 15/78   (2006.01)
G06F 15/76   (2006.01)

(52) U.S. Cl.
CPC ...... *G06F 13/4022* (2013.01); *G06F 13/4282* (2013.01); *G06F 15/76* (2013.01); *G06F 15/7807* (2013.01)

(58) Field of Classification Search
CPC .. G06F 13/4022; G06F 13/4282; G06F 15/76; G06F 15/7807
See application file for complete search history.

(56) References Cited

U.S. PATENT DOCUMENTS

| 9,405,314 | B1* | 8/2016 | Naviasky ................ G06F 1/12 |
| 2009/0103572 | A1* | 4/2009 | Zerbe .................... H04L 25/14 370/503 |
| 2011/0069782 | A1 | 3/2011 | Wilson et al. |
| 2012/0128097 | A1* | 5/2012 | Hughes ............ H04L 25/03343 375/296 |
| 2014/0266320 | A1 | 9/2014 | Conrow et al. |

(Continued)

OTHER PUBLICATIONS

International Preliminary Report on Patentbility in International Patent Application No. PCT/US2017/062677, dated Jul. 2, 2019; 7 pages.

(Continued)

*Primary Examiner* — Henry Tsai
*Assistant Examiner* — Aurangzeb Hassan
(74) *Attorney, Agent, or Firm* — Alliance IP, LLC

(57) ABSTRACT

Aspects of the embodiments are directed to calibrating a cross-talk cancellation module. A data eye response for a first data channel can be acquired, and the left-side and right-side maximum transition edges can be determined while adjacent data channels are silent. The adjacent data channels can be activated, first using an even mode waveform. A strobe can be positioned at the left-side maximum boundary in anticipation of a right-shift due to even mode waveform cross talk. A summer circuit can sum the waveform from the first data channel with cross-talk induced voltage pulse having an opposite polarity from the even mode waveforms on the aggressor channels. A left-side edge can be determined by incrementally adjusting gain and detector parameters. These parameters can be locked once a left-side transition edge is located. The process can be repeated for a right-side transition edge with odd-mode aggressor waveforms.

15 Claims, 12 Drawing Sheets

(56) References Cited

U.S. PATENT DOCUMENTS

| | | | |
|---|---|---|---|
| 2015/0162952 A1* | 6/2015 | Hollis | H04B 3/487 370/201 |
| 2016/0026597 A1* | 1/2016 | Leddige | G06F 13/20 710/105 |
| 2016/0182046 A1 | 6/2016 | Cai et al. | |
| 2016/0283429 A1* | 9/2016 | Wagh | G06F 13/4022 |
| 2016/0285624 A1* | 9/2016 | Wagh | H04B 3/46 |
| 2018/0276164 A1* | 9/2018 | Das Sharma | G06F 13/4265 |

OTHER PUBLICATIONS

International Search Report and Written Opinion in International Application No. PCT/US2017/062677 dated Mar. 19, 2018, 10 pages.

\* cited by examiner

ADAPTIVE CALIBRATION TECHNIQUE FOR CROSS TALK CANCELLATION

FIELD

This disclosure pertains to circuits and techniques to compensate for and/or cancel cross talk, and more particularly, to digital adaptive calibration for cross talk cancellation.

BACKGROUND

High speed Gigabit parallel interfaces face severe timing margin loss due to Far-end crosstalk (FEXT), which includes the interference from an adjacent aggressor line, and is becoming a major noise source contribution to the system link AC timing budget. This problem is exacerbated at high speed data rate where signals to FEXT amplitude ratio decreases. Additionally, FEXT introduces deterministic jitter (DJ) in the received signal by altering the amplitude of the signal at the zero-crossing points, thereby further degrading the receiver's bit-error rate (BER) performance or degrade the receiver data eye-margin timing. As shown in FIG. 2, where same direction (even transition) of top and bottom lanes (aggressors) switching with respect to middle (victim) lane causes data eye to shift towards the right side and similarly as aggressors go through opposite (odd transition) direction switching causes the eye-diagram to shift to left side, resulting degrading effective eye-margin for received data.

DETAILED DESCRIPTION

Figure 1:
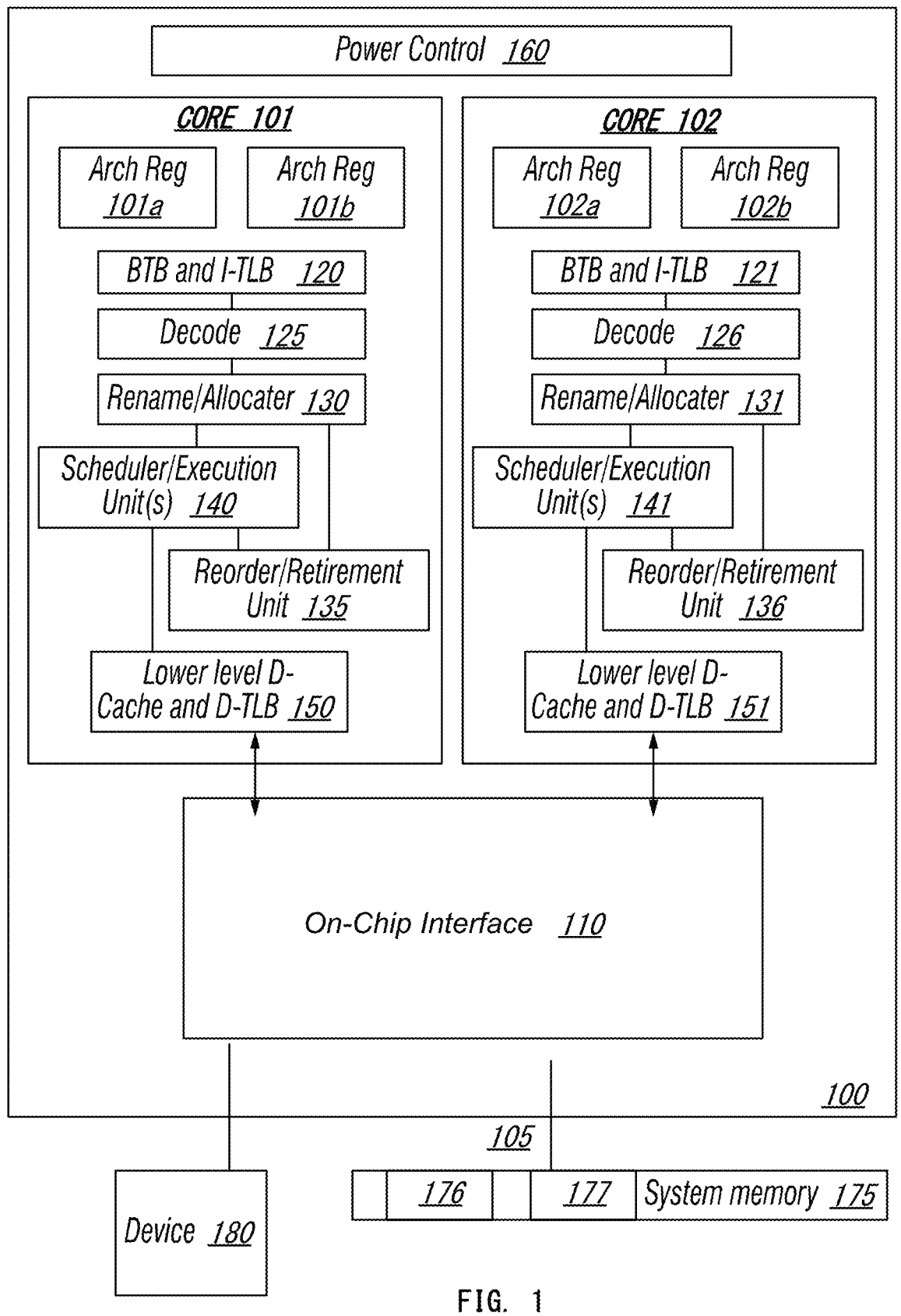
FIG. 1 illustrates an embodiment of a block diagram for a computing system including a multicore processor.
Figure 2:
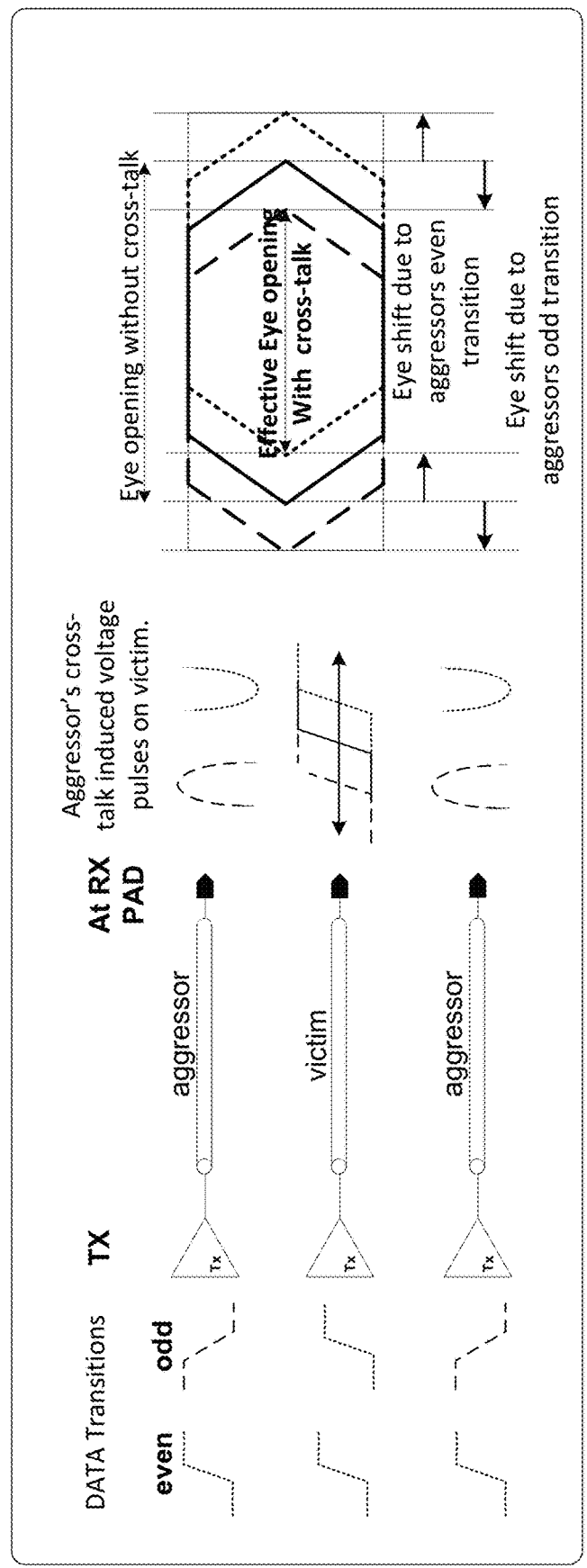
FIG. 2 is a schematic and timing diagram illustrating cross talk across parallel lanes.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 3A:
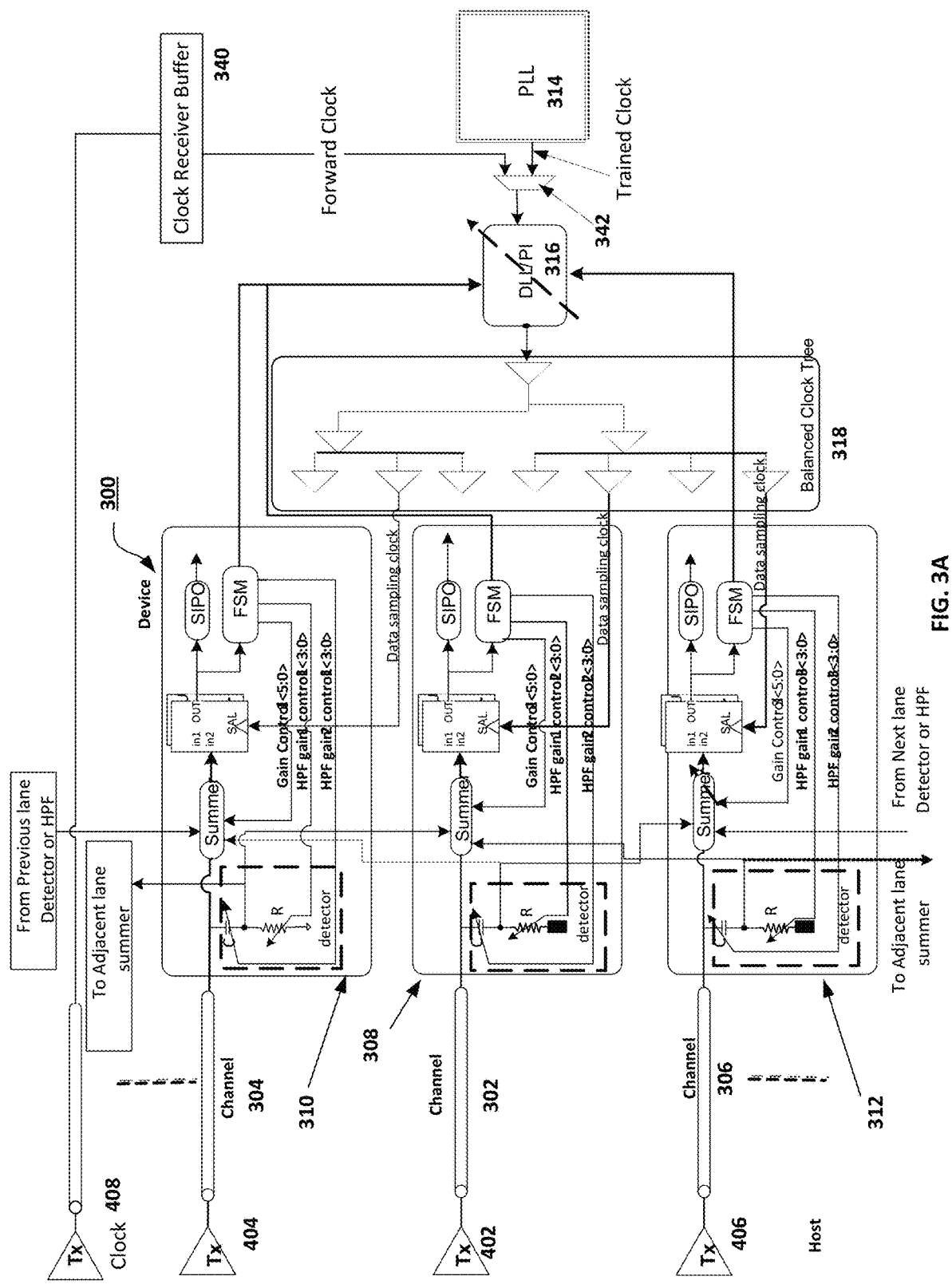
FIG. 3A is a schematic diagram of cross-talk calibration circuitry in accordance with embodiments of the present disclosure.
Figure 4:
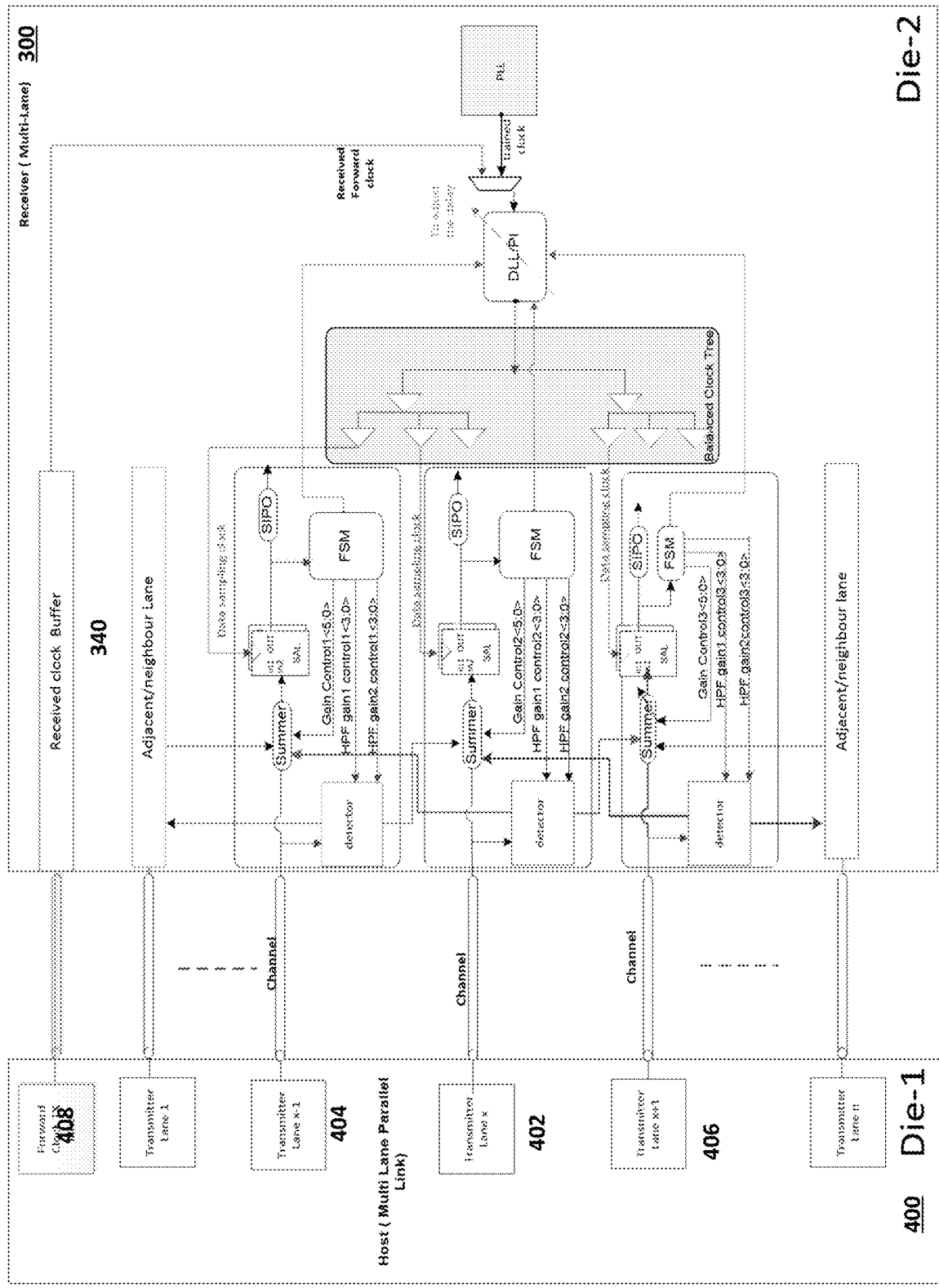
FIG. 4 is a schematic diagram of a cross-talk calibration circuit connected to a plurality of host elements in accordance with embodiments of the present disclosure.

FIG. 3A is a schematic diagram of cross-talk calibration circuitry in accordance with embodiments of the present disclosure. FIG. 3A illustrates a receiving device 300 that is coupled to one or more transmitters. For example, transmitter 402 can be coupled to the receiver 300 by a first data channel 302. First data channel 302 will be referred herein as an example of a victim lane 302. Transmitter 404 can be coupled to receiver by a second data channel 304. second data channel is referred to herein as an aggressor lane 304 to victim lane 302. Transmitter 406 can be coupled to receiver 300 by a third data channel 306. Third data channel 306 can also be an aggressor lane to victim lane 302. It is understood that more data channels can be supported by a multi-lane transmitter and multi-lane receiver (as shown in FIG. 4). It is also understood that first data channel 302 can be an aggressor to one or both of the second data channel 304 and third data channel 306.

The receiving device 300 also includes a first cross-talk cancellation module 308 coupled to the victim lane 302. Receiving device 300 includes a second cross-talk cancellation module 310 coupled to aggressor lane 304. Receiving device 300 includes a third cross-talk cancellation module 312 coupled to aggressor lane 306.

Each cross-talk cancellation module can be controlled by a phase lock loop module 314 and a delay locked look/phase interpolator 316. The delay locked loop/phase interpolator gets clock signal input through a multiplexer 342 either from a forwarded transmitter strobe clock 408 through dedicated lane from a receive clock buffer 340 or from trained clock from PLL 314. The delay lock look/phase interpolator 316 can be coupled to a balanced clock tree 318 that provides sampling clocks to each of the first, second, and third cross-talk cancellation modules 308-312.

Figure 3B:
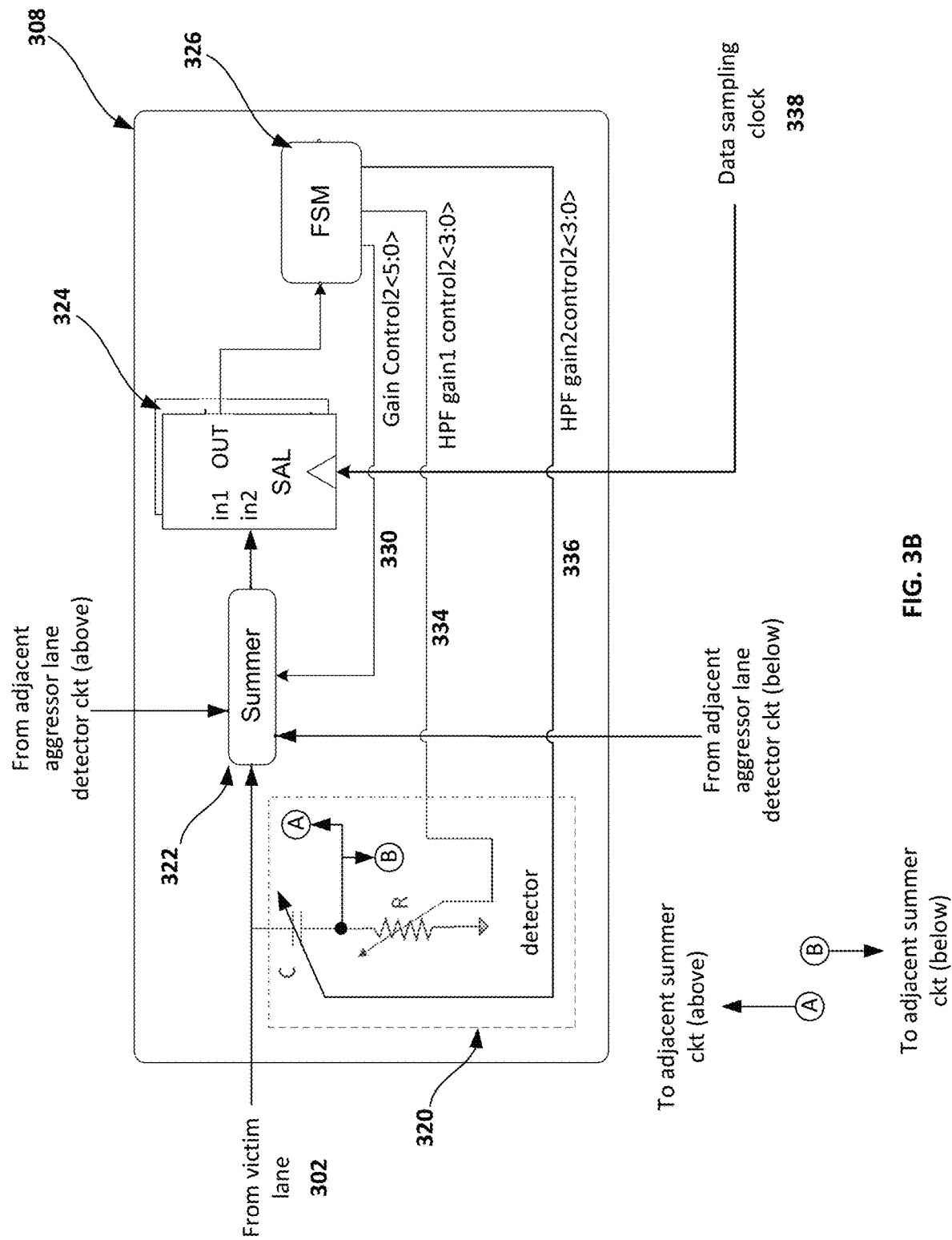
FIG. 3B is a schematic diagram of an example cross-talk cancellation module in accordance with embodiments of the present disclosure.

FIG. 3B is a schematic diagram of an example cross-talk cancellation module 308 in accordance with embodiments of the present disclosure. The cross-talk cancellation module 308 can implement a training algorithm to set one or more calibration parameters to compensate for and/or cancel cross-talk on a victim lane from one or more adjacent aggressor lanes. The cross-talk cancellation module 308 includes a summer circuit 322 that receives a first waveform from the victim lane as an input. The summer circuit 322 also receives as an input a cross-talk induced voltage from a detector circuit from one or more adjacent aggressor lanes.

The detector 320 is configured to sense a waveform's switching polarity and produce an opposite sense pulse to add in to victim data. Here, the detector 320 outputs to adjacent summer circuits, but is shown to illustrate the detector components. Adjacent detector circuits would have the same or similar components (which are described in more detail in FIG. 3C). The summer circuit 322 receives pulses from adjacent detector circuits and sums the first waveform with the received pulses.

The summer circuit 322 outputs a summed signal to the latch circuit 324. The latch circuit 324 can be a strong arm latch (SAL) or other equivalent circuit which is the main or functional data receiver. The latch circuit 324 samples the summed signal to identify values based on the sampling clock input 338. The latch circuit 324 can be clocked to identify transition periods in the summed circuit. The latch circuit 324 can output values to a finite state machine 326. Finite state machine 326 can determine whether the values identified by the latch circuit 324 correspond to transition periods in the summed data. The finite state machine 326 can then adjust the detector circuit parameters and/or the gain of the summer circuit so that the summed signal has transitions at times that correspond more closely with a pure waveform (i.e., a waveform that is detected while aggressor lanes are off—no cross-talk). The finite state machine 326 can output gain control signal 330 to the summer circuit 322. The finite state machine 326 can also output detector parameter control signals 334 and 336.

Figure 3C:
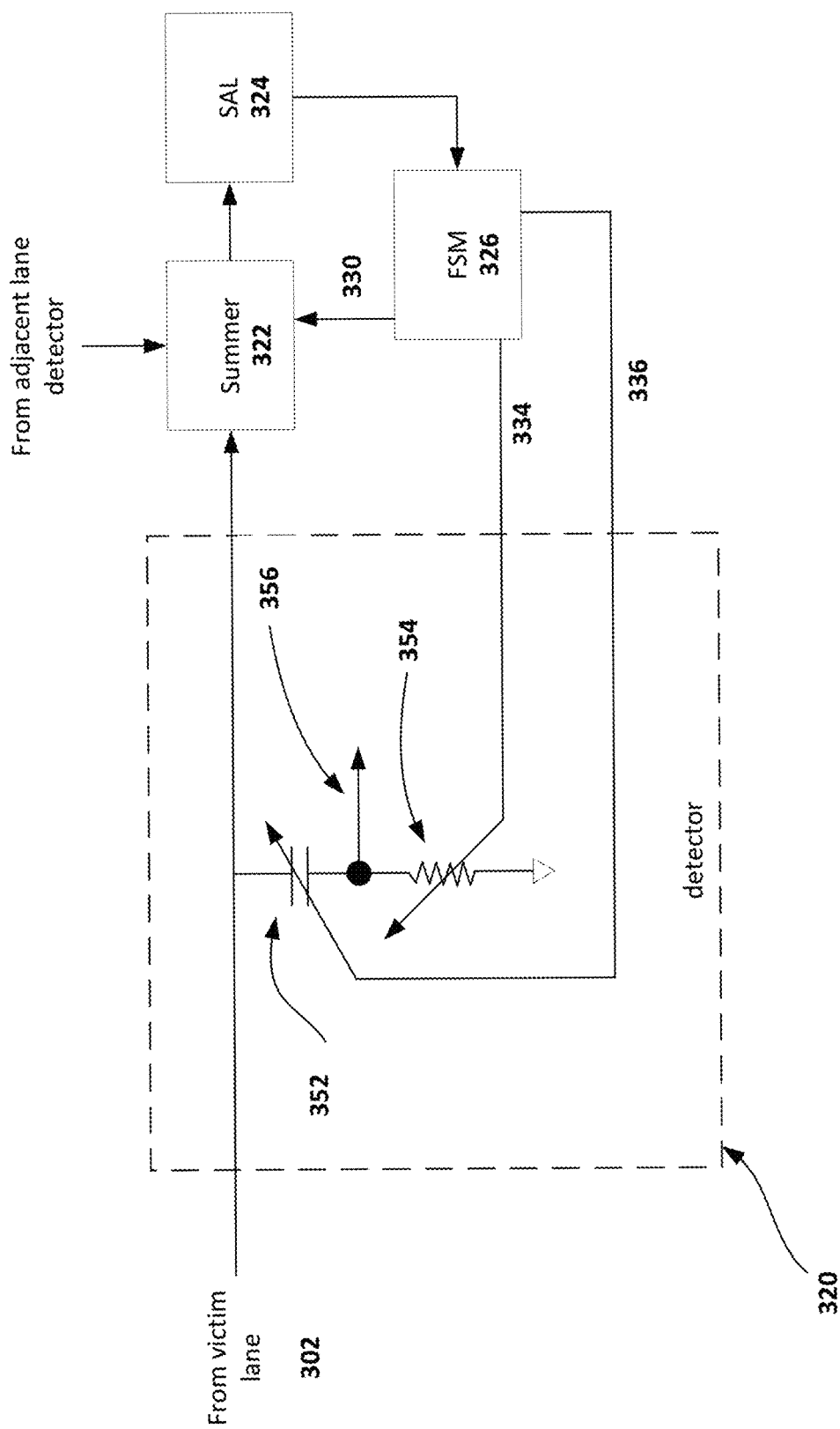
FIG. 3C is a schematic diagram of an example detector circuit in accordance with embodiments of the present disclosure.

FIG. 3C is a schematic diagram of an example detector circuit 320 in accordance with embodiments of the present disclosure. As mentioned above, the detector circuit 320 is to sense a waveform's switching polarity and produce an opposite sense pulse or waveform to add in to victim data at a summer circuit associated with a victim lane. The detector circuit 320 outputs to a summer circuit in adjacent cross-talk cancellation modules (in this case, detector circuit 320 outputs to a detector circuit in the second cross-talk cancellation module 310 and to a detector circuit in the third cross-talk cancellation module 312).

The detector circuit 320 can be a high pass filter (HPF) or differentiator circuit or any active detector circuits. The detector circuit 320 can include a thermometric selectable capacitance 352 and a binary weighted resistance 354 in series. The output 356 of the detector 320 can be received by the summer circuits of adjacent cross-talk cancellation modules.

As mentioned above, the finite state machine 326 can adjust the resistance of the detector 320 by a control signal 334. The finite state machine 326 can also adjust the capacitance of the detector 320 by a control signal 336.

FIG. 4 is a schematic diagram of a cross-talk calibration circuit connected to a plurality of host elements in accordance with embodiments of the present disclosure. FIG. 4 illustrates a transmitter die 400 that includes a plurality of transmitters. For example transmitter die 400 includes a first transmitter 402 coupled to the receiver 300 by a first data channel 302. Likewise, a second transmitter 404 is coupled to the receiver 300 by a second data channel 304. A third transmitter 406 is coupled to the receiver 300 by a second data channel 306. The transmitter die 400 can be a multi-lane host that is connected to receiver 300 by a parallel link configuration. The transmitter die 400 can also include a clock 408 that provides forward transmitter strobe clock signals to the receiver 300.

Figure 5A:
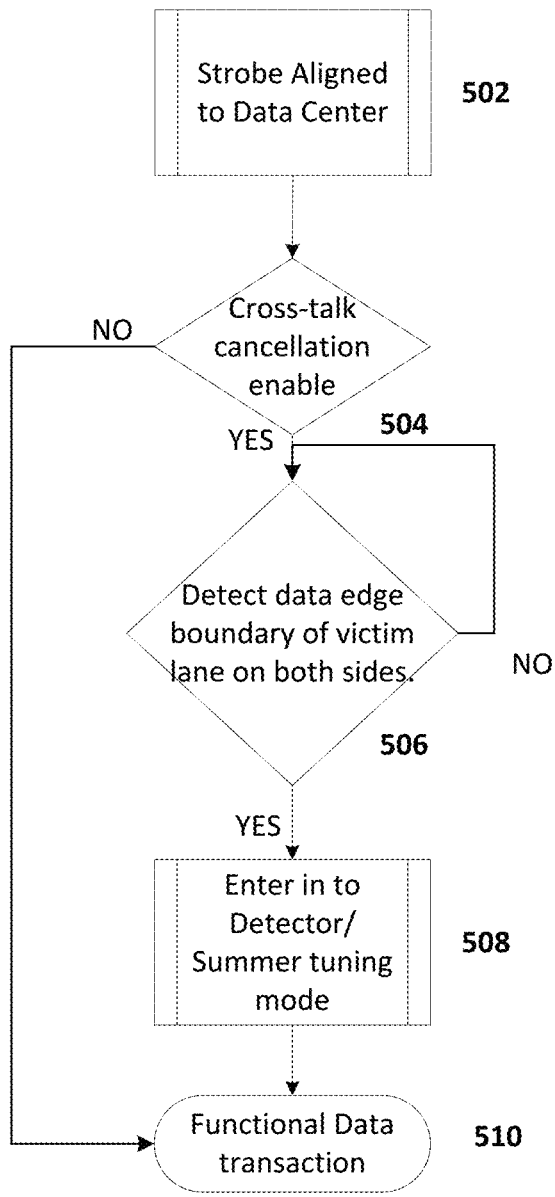
FIG. 5A is a process flow diagram for training for cross-talk calibration in accordance with embodiments of the present disclosure.

FIG. 5A is a process flow diagram 500 for training for cross-talk calibration in accordance with embodiments of the present disclosure. At the outset, a strobe can be aligned to a center of an eye response for data received by the receiver (502). The strobe can be controlled by the delay lock loop/phase interpolator controlling the clock. A controller can determine whether the cross-talk cancellation algorithm is implemented (504). If the cross-talk cancellation algorithm is activated, the host makes the aggressor lanes (i.e., adjacent lanes to the lane under test) to be silent with respect to a selected victim lane to find the available maximum eye response to a test waveform. The left and right transition boundaries (or edge boundaries) of the eye response are determined (506). If no edge boundaries are found, the detection continues until the edge boundaries are found. Once the edge boundaries are found, the algorithm enters into the cross-talk cancellation calibration state (508). Once calibration is complete for all lanes, the receiver can enter into a functional data transaction state using the calibration coefficients determined by the calibration state (510).

Figure 5B:
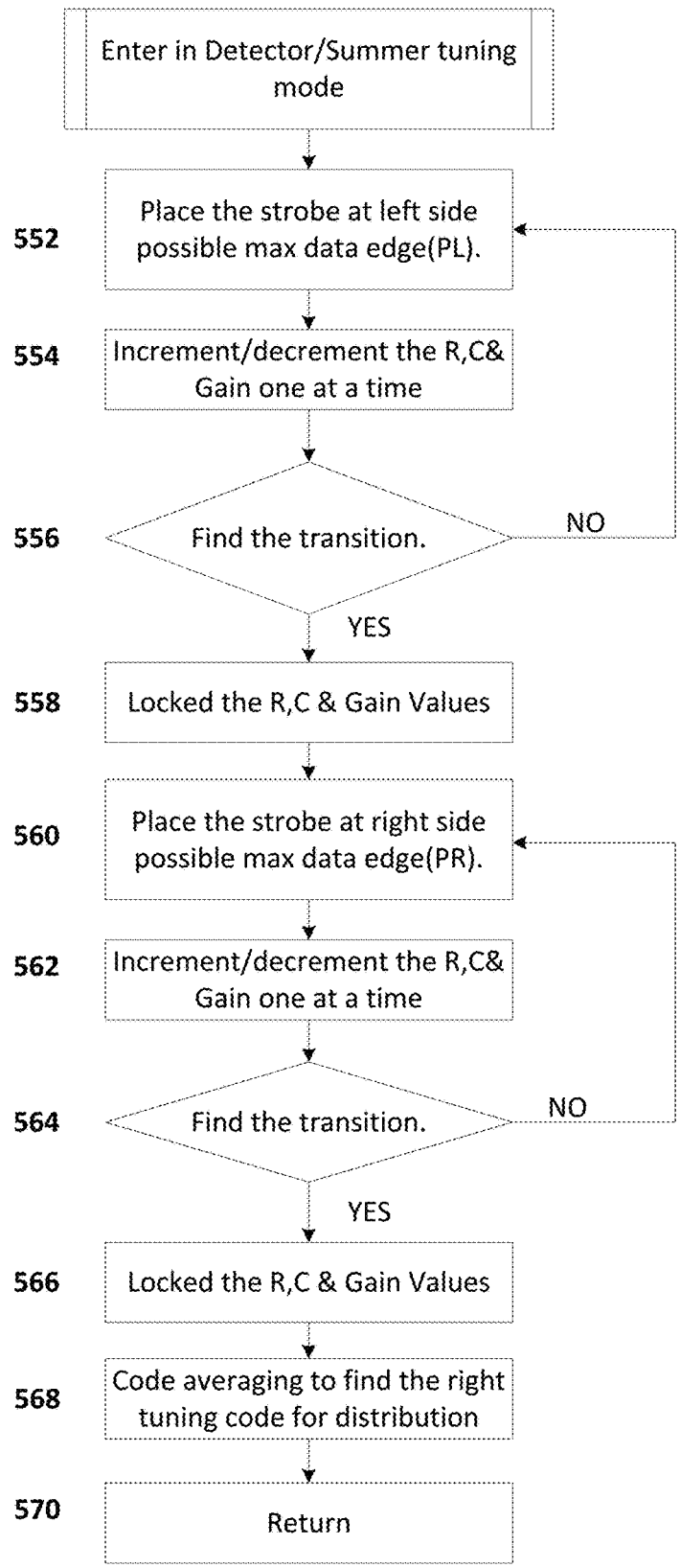
FIG. 5B is a process flow diagram for determining cross-talk calibration coefficients in accordance with embodiments of the present disclosure.

FIG. 5B is a process flow diagram 508 for determining cross-talk calibration coefficients in accordance with embodiments of the present disclosure. The strobe is positioned at a maximum possible left-side data edge of the eye response (552). This positioning can be done by placing the strobe a few ticks left of the left edge boundary (determined previously with aggressor lanes silent) in anticipation that the left-side edge boundary is going to shift right due to even mode switching of aggressor lanes. The aggressor lanes are activated using an even mode waveform, where the switching of the aggressor lane waveform matches the switching of the victim lane waveform. The values of the summer gain and the detector R and C can be set (554), and a transition can the searched for (556). If no transition is found, then the summer gain and detector R and C can be changed incrementally and one at a time until a transition is found (554). In embodiments, the strobe can be adjusted incrementally to approximate a likely transition position based on detected jitter in the eye response (552). Once a transition is located, the values for gain and R and C are locked (558).

The strobe can be positioned at a maximum possible right-side edge boundary for the eye response (560). This positioning can be done by placing the strobe a few ticks right of the right edge boundary (determined previously with aggressor lanes silent) in anticipation that the right-side edge boundary is going to shift left due to odd mode switching of aggressor lanes. The aggressor lanes are activated using an odd mode waveform, where the switching of the aggressor lane waveform is opposite the switching of the victim lane waveform. The values of the summer gain and the detector R and C can be set (562), and a transition can the searched for (564). If no transition is found, then the summer gain and detector R and C can be changed incrementally and one at a time until a transition is found (562). In embodiments, the strobe can be adjusted incrementally to approximate a likely transition position based on detected jitter in the eye response (560). Once a transition is located, the values for gain and R and C are locked (566). A code averaging can be performed to determine the correct tuning code for distribution (568). The algorithm can repeat for all lanes, and return to the functional data transaction state (570).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
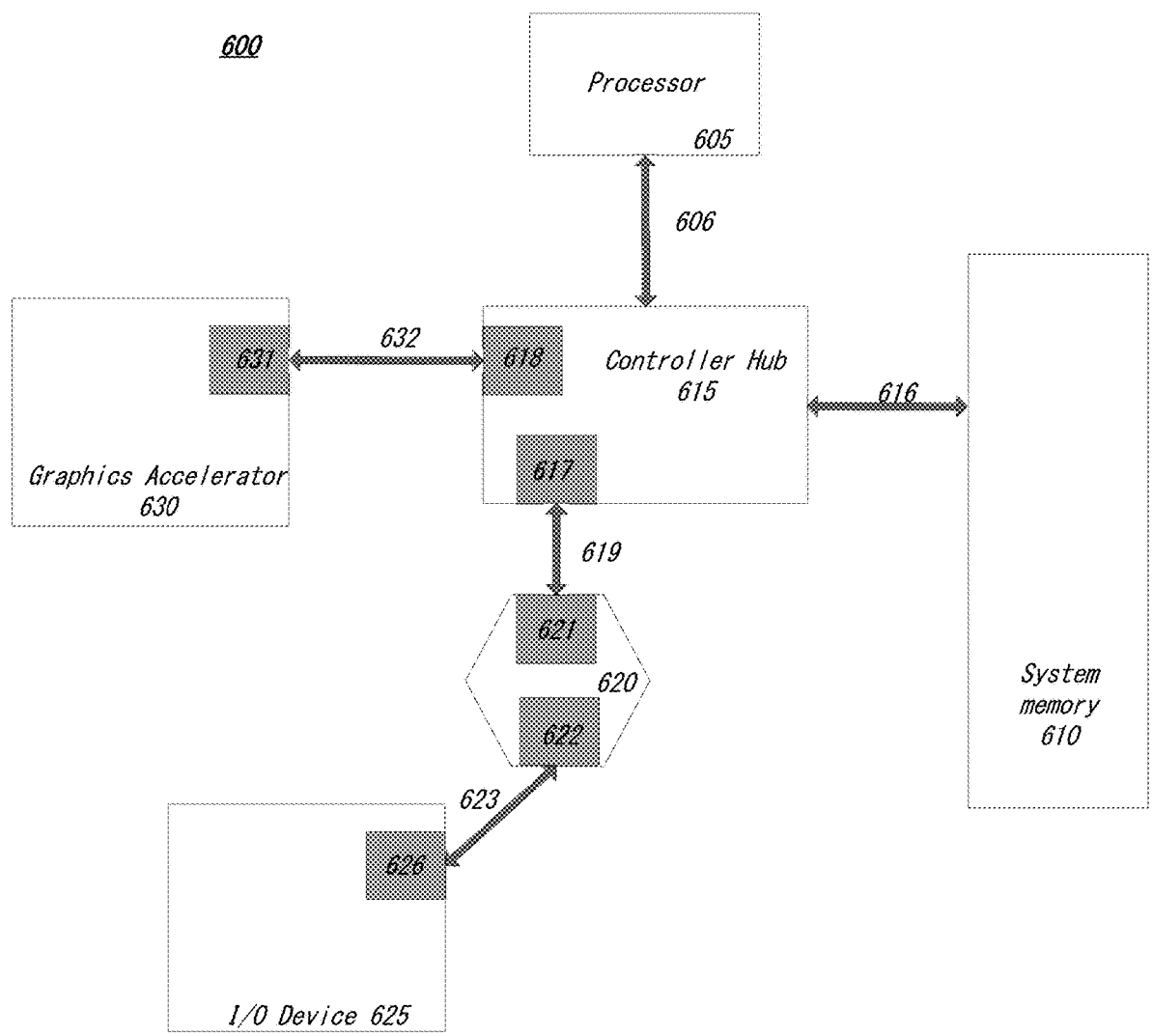
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
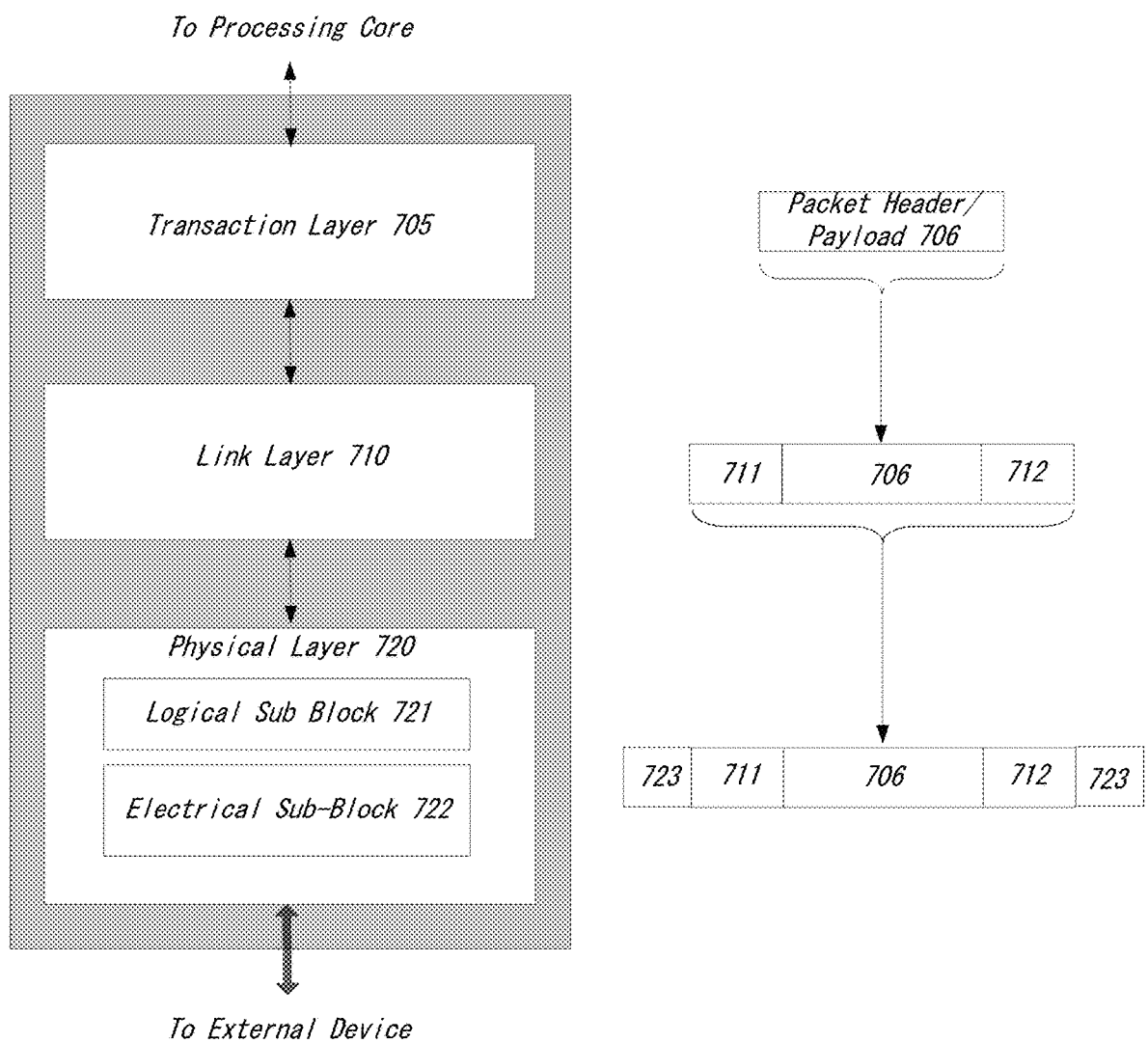
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCie stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 615 in FIG. 6, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
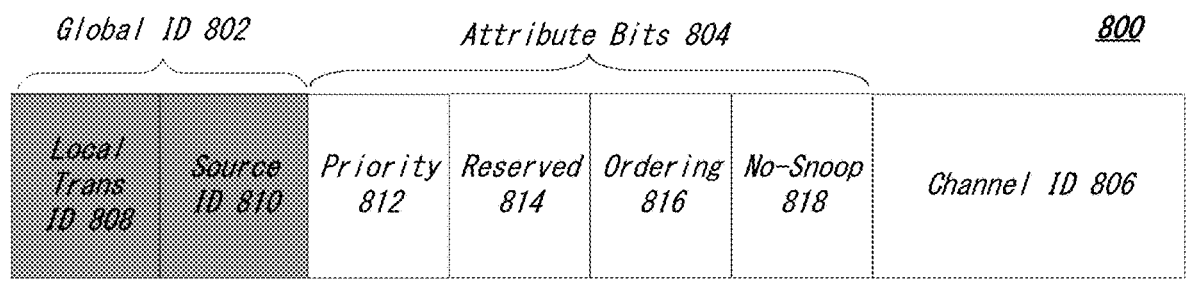
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
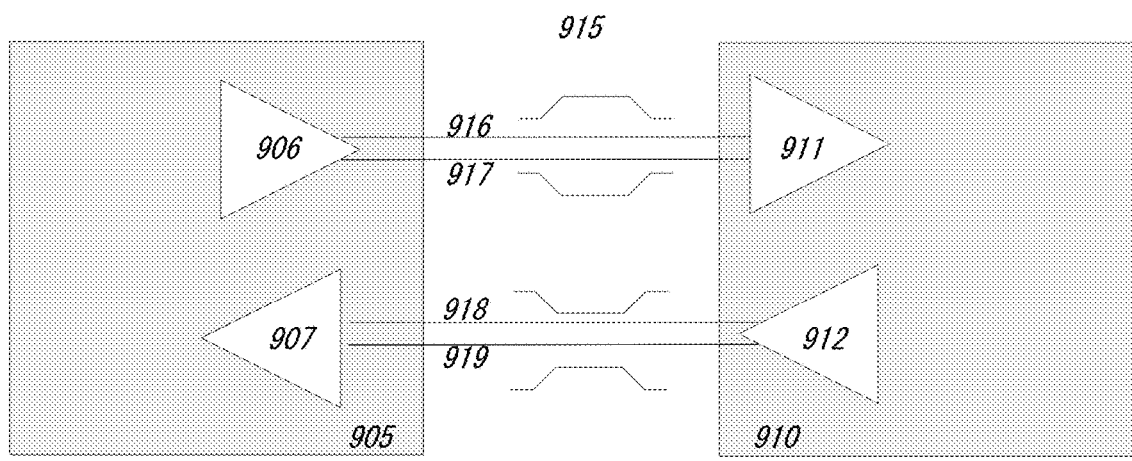
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
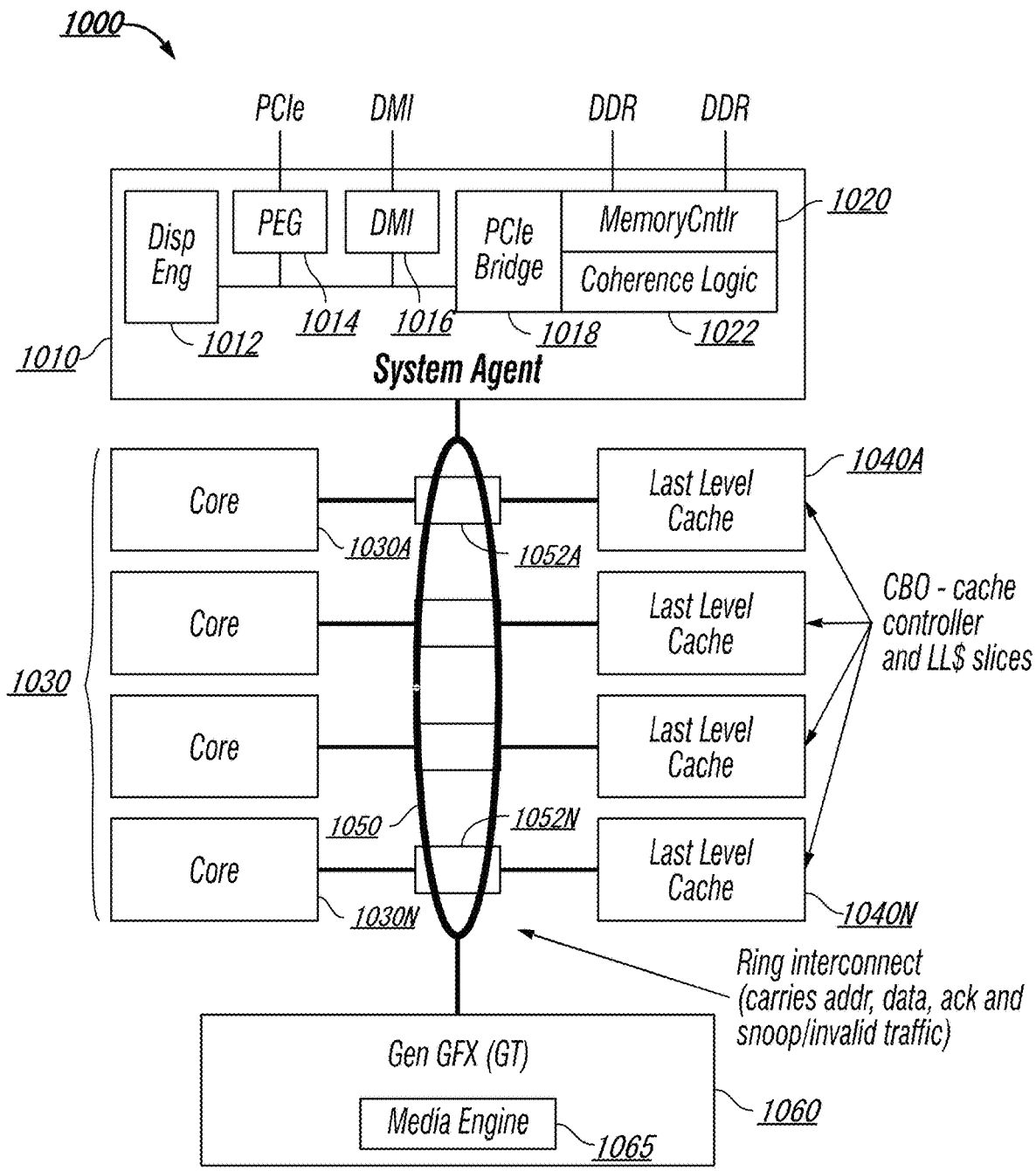
FIG. 10 illustrates a block diagram of an embodiment of a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is an apparatus for reducing cross talk due to adjacent transmission buses switching. The apparatus includes logic circuitry to detect a first signal waveform from a first communications channel; logic circuitry to determine a center point of an eye response for the first signal waveform; logic circuitry to determine a first transition edge boundary for the eye response; logic circuitry to determine a second transition edge boundary for the eye response; logic circuitry to transmit a second signal waveform on a second communications channel; logic circuitry to combine the first signal waveform with cross-talked induced voltage from the second signal waveform; and logic circuitry to adjust a gain of the first communications channel to adjust the eye response towards one or both of the first transition edge boundary or the second transition edge boundary of the eye response.

Example 2 may include the subject matter of example 1, wherein the logic circuitry to transmit the second signal waveform comprises a strobe.

Example 3 may include the subject matter of any of examples 1 or 2, and can also include a detection circuit to detect cross-talked induced voltage from the second channel and output a pulse signal having opposite polarity to the second signal waveform.

Example 4 may include the subject matter of example 3, wherein the logic circuitry to adjust the gain of the first communications channel comprises a variable capacitor and a variable resistor in series.

Example 5 may include the subject matter of example 3, wherein the detection circuit comprises a high pass filter.

Example 6 may include the subject matter of example 3, wherein the detection circuit comprises a differentiator circuit.

Example 7 may include the subject matter of any of examples 1-6, wherein the logic circuitry to adjust the gain comprises a summer circuit to sum the first waveform and the cross-talked induced voltage from the second waveform.

Example 8 may include the subject matter of any of examples 1-7, and can also include a finite state machine to adjust the noise detection circuit.

Example 9 may include the subject matter of any of examples 1-8, and can also include a latch circuit to sample the output of the logic circuit to adjust the gain of the first communications channel.

Example 10 may include the subject matter of any of examples 1-9, and can also include a phase locked loop circuit to control clock signals for sampling the combined first signal waveform with cross-talked induced voltage.

Example 11 is a method of calibrating a receiver for cross-talk cancellation, the method including receiving a first signal waveform from a first channel; determining an eye response of the first signal waveform; determining a left-side transition edge of the eye response; determining a right-side transition edge of the eye response; receiving a signal pulse representative of an opposite polarity of a second signal waveform polarity; summing the first signal waveform and the signal pulse; sampling the summed first signal waveform and the signal pulse at a clock position proximate to one of the left-side transition edge or the right-side transition edge; adjusting one or more detector parameters until a transition is detected; and storing the one or more detector parameters.

Example 12 may include the subject matter of example 11, wherein adjusting one or more detector parameters comprises adjusting one or more of a gain of a summing circuit, a resistance of a detection circuit or a capacitance of a detection circuit.

Example 13 may include the subject matter of any of examples 11-12, and can also include applying a gain to the summing of the first signal waveform and the signal pulse.

Example 14 may include the subject matter of any of examples 11-13, and can also include adjusting a clock signal to determine the left-side transition edge of the eye response; and adjusting the clock signal to determine the right-side transition edge of the eye response.

Example 15 may include the subject matter of any of examples 11-14, and can also include setting a sampling clock to a right side of the left-side transition edge prior to sampling the summed first signal waveform; and detecting the left-side transition edge based on adjusting one or more detector parameters.

Example 16 is a system that includes a data link comprising a plurality of lanes, the data link compliant with a peripheral component interconnect express (PCIe) protocol, the plurality of lanes comprising a victim lane and an aggressor lane; a first data transmitter coupled to the victim lane; a second data transmitter coupled to the aggressor lane; a receiver comprising a first cross-talk cancellation module coupled to the victim lane; and a second cross-talk cancellation module coupled to the aggressor lane; wherein the first cross-talk cancellation module comprises a summer circuit coupled to the victim lane; and the second cross-talk cancellation module comprises a differentiator circuit coupled to the aggressor lane, the differentiator circuit to output a cross-talk induced voltage, the differentiator circuit comprising an output coupled to the summer circuit of the victim lane, the summer circuit to sum a first waveform received across the victim lane with the cross-talk induced voltage output from the differentiator.

Example 17 may include the subject matter of example 16, wherein the differentiator circuit comprises a variable resistor and a variable capacitor.

Example 18 may include the subject matter of any of examples 16-17, wherein the differentiator circuit is configured to output the cross-talk induced voltage having an opposite polarity than a signal received by the differentiator circuit on the aggressor channel.

Example 19 may include the subject matter of any of examples 16-18, and can also include a latch circuit coupled to an output of the summer circuit, the latch circuit controlled by a sampling clock, the latch circuit to sample the output of the summer circuit to identify a transition timing of a digital signal of the output of the summer circuit.

Example 20 may include the subject matter of example 19, and can also include a finite state machine coupled to an output of the latch circuit, the finite state machine to determine one or more parameters for the differentiator circuit to adjust the transition timing of the digital signal.

What is claimed is:

1. An apparatus for reducing cross talk between adjacent transmission buses, the apparatus comprising:
    logic circuitry to detect a first signal waveform from a first communications channel;
    logic circuitry to determine a center point of an eye response for the first signal waveform;
    logic circuitry to determine a first transition edge boundary for the eye response;
    logic circuitry to determine a second transition edge boundary for the eye response;
    logic circuitry to transmit a second signal waveform on a second communications channel;
    logic circuitry to combine the first signal waveform with cross-talked induced voltage from the second signal waveform; and
    logic circuitry to adjust a gain of the first communications channel to adjust the eye response towards one or both of the first transition edge boundary or the second transition edge boundary of the eye response;
    further comprising a detection circuit to detect cross-talked induced voltage from the second channel and output a pulse signal having opposite polarity to the second signal waveform;
    wherein the detection circuit comprises a high pass filter.

2. The apparatus of claim 1, wherein the logic circuitry to transmit the second signal waveform comprises a strobe.

3. The apparatus of claim 1, wherein the logic circuitry to adjust the gain of the first communications channel comprises a variable capacitor and a variable resistor in series.

4. The apparatus of claim 1, wherein the detection circuit comprises a differentiator circuit.

5. The apparatus of claim 1, wherein the logic circuitry to adjust the gain comprises a summer circuit to sum the first waveform and the cross-talked induced voltage from the second waveform.

6. The apparatus of claim 1, further comprising a finite state machine to adjust the noise detection circuit.

7. The apparatus of claim 1, further comprising a latch circuit to sample the output of the logic circuit to adjust the gain of the first communications channel.

8. The apparatus of claim 1, further comprising a phase locked loop for internal clock usage time or delay locked loop including phase interpolator for forward clock usage time circuit to control clock signals for sampling the combined first signal waveform with cross-talked induced voltage.

9. A method of calibrating a receiver for cross-talk cancellation, the method comprising:
    receiving a first signal waveform from a first channel;
    determining an eye response of the first signal waveform;
    determining a left-side transition edge of the eye response;
    determining a right-side transition edge of the eye response;
    receiving a signal pulse representative of an opposite polarity of a second signal waveform polarity;
    summing the first signal waveform and the signal pulse;
    sampling the summed first signal waveform and the signal pulse at a clock position proximate to one of the left-side transition edge or the right-side transition edge;
    adjusting one or more detector parameters until a transition is detected; and
    storing the one or more detector parameters;
    wherein adjusting one or more detector parameters comprises adjusting one or more of a gain of a summing circuit, a resistance of a detection circuit or a capacitance of a detection circuit.

10. The method of claim 9, further comprising applying a gain to the summing of the first signal waveform and the signal pulse.

11. The method of claim 9, further comprising:
    adjusting a clock signal to determine the left-side transition edge of the eye response; and
    adjusting the clock signal to determine the right-side transition edge of the eye response.

12. The method of claim 9, further comprising setting a sampling clock to a right side of the left-side transition edge prior to sampling the summed first signal waveform; and
    detecting the left-side transition edge based on adjusting one or more detector parameters.

13. A system comprising:
    a data link comprising a plurality of lanes, the data link compliant with a peripheral component interconnect express (PCIe) protocol, the plurality of lanes comprising a victim lane and an aggressor lane;
    a first data transmitter coupled to the victim lane;
    a second data transmitter coupled to the aggressor lane;
    a receiver comprising a first cross-talk cancellation module coupled to the victim lane;
    and a second cross-talk cancellation module coupled to the aggressor lane;
    wherein:
    the first cross-talk cancellation module comprises a summer circuit coupled to the victim lane; and
    the second cross-talk cancellation module comprises a differentiator circuit coupled to the aggressor lane, the differentiator circuit to output a cross-talk induced voltage, the differentiator circuit comprising an output coupled to the summer circuit of the victim lane, the summer circuit to sum a first waveform received across the victim lane with the cross-talk induced voltage output from the differentiator;

wherein the differentiator circuit is configured to output the cross-talk induced voltage having an opposite polarity than a signal received by the differentiator circuit on the aggressor channel;

wherein the differentiator circuit comprises a variable resistor and a variable capacitor.

14. The system of claim 13, further comprising a latch circuit coupled to an output of the summer circuit, the latch circuit controlled by a sampling clock, the latch circuit to sample the output of the summer circuit to identify a transition timing of a digital signal of the output of the summer circuit.

15. The system of claim 14, further comprising a finite state machine coupled to an output of the latch circuit, the finite state machine to determine one or more parameters for the differentiator circuit to adjust the transition timing of the digital signal.

* * * * *